(12) United States Patent
Bergkoetter et al.

(10) Patent No.: US 8,364,332 B2
(45) Date of Patent: Jan. 29, 2013

(54) CONTROL ALGORITHM FOR LOW-VOLTAGE CIRCUIT IN HYBRID AND CONVENTIONAL VEHICLES

(75) Inventors: Brenton J. Bergkoetter, Milford, MI (US); William L. Aldrich, III, Davisburg, MI (US); Goro Tamai, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 478 days.

(21) Appl. No.: 12/687,918

(22) Filed: Jan. 15, 2010

(65) Prior Publication Data

US 2011/0178661 A1    Jul. 21, 2011

(51) Int. Cl.
*G06F 7/00* (2006.01)
(52) U.S. Cl. .............................. 701/22; 477/2; 180/65.21
(58) Field of Classification Search .................... 701/22, 701/36, 70; 477/2, 3, 4; 180/65.1, 65.21, 180/65.31, 65.265, 65.285, 65.29
See application file for complete search history.

(56) References Cited

U.S. PATENT DOCUMENTS

| | | | | |
|---|---|---|---|---|
| 5,291,960 A | * | 3/1994 | Brandenburg et al. | 180/65.27 |
| 5,441,122 A | * | 8/1995 | Yoshida | 180/65.245 |
| 5,654,887 A | * | 8/1997 | Asa et al. | 701/22 |
| 6,554,088 B2 | * | 4/2003 | Severinsky et al. | 180/65.23 |
| 6,877,576 B2 | * | 4/2005 | Wilton et al. | 180/65.245 |
| 6,885,920 B2 | * | 4/2005 | Yakes et al. | 701/22 |

\* cited by examiner

*Primary Examiner* — Richard M. Camby
(74) *Attorney, Agent, or Firm* — Quinn Law Group, PLLC

(57) ABSTRACT

A method for controlling a low-voltage circuit of a vehicle having a generator includes monitoring operating conditions of the vehicle and determining whether surplus generator load is available. Available surplus generator load is captured and used to power the low-voltage circuit. The low-voltage circuit may include a low-voltage battery, which may be charged with the surplus generator load. The surplus generator load may be utilized for anti-sulfation of the low-voltage battery. The method is usable with both a hybrid vehicle and a conventional vehicle. The method may further include powering the low-voltage circuit with energy stored in the low-voltage battery as a result of charging the low-voltage battery with the surplus generator load.

13 Claims, 4 Drawing Sheets

CONTROL ALGORITHM FOR LOW-VOLTAGE CIRCUIT IN HYBRID AND CONVENTIONAL VEHICLES

TECHNICAL FIELD

This disclosure relates to control of low-voltage circuits in vehicles.

BACKGROUND OF THE INVENTION

Many vehicles and construction implements include a type of rechargeable battery that supplies electric energy to an automobile. These batteries are often referred to as a twelve-volt battery or an SLI (starting, lighting, ignition) battery to power the starter motor, the lights, the ignition system of a vehicle's engine, and other vehicle accessories. The SLI battery may be charged with an alternator. Hybrid vehicles may have additional batteries that are charged via power generated by an electric machine, such as a motor/generator. The electric machine (or electric machines) of a hybrid vehicle may replace the alternator.

SUMMARY

A method for controlling a low-voltage circuit of a vehicle having a generator or electric machine is provided. The method includes monitoring operating conditions of the vehicle and determining whether surplus generator load is available. Available surplus generator load is captured and used to power the low-voltage circuit.

The low-voltage circuit may include a low-voltage battery, which may be charged with the surplus generator load. The surplus generator load may be utilized for anti-sulfation of the low-voltage battery. The method is usable with both a hybrid vehicle and a conventional vehicle. The method may further include powering the low-voltage circuit with energy stored in the low-voltage battery as a result of charging the low-voltage battery with the surplus generator load.

The above features and advantages and other features and advantages of the present invention are readily apparent from the following detailed description of the best modes and other embodiments for carrying out the invention when taken in connection with the accompanying drawings.

DESCRIPTION OF PREFERRED EMBODIMENTS

Figure 1:
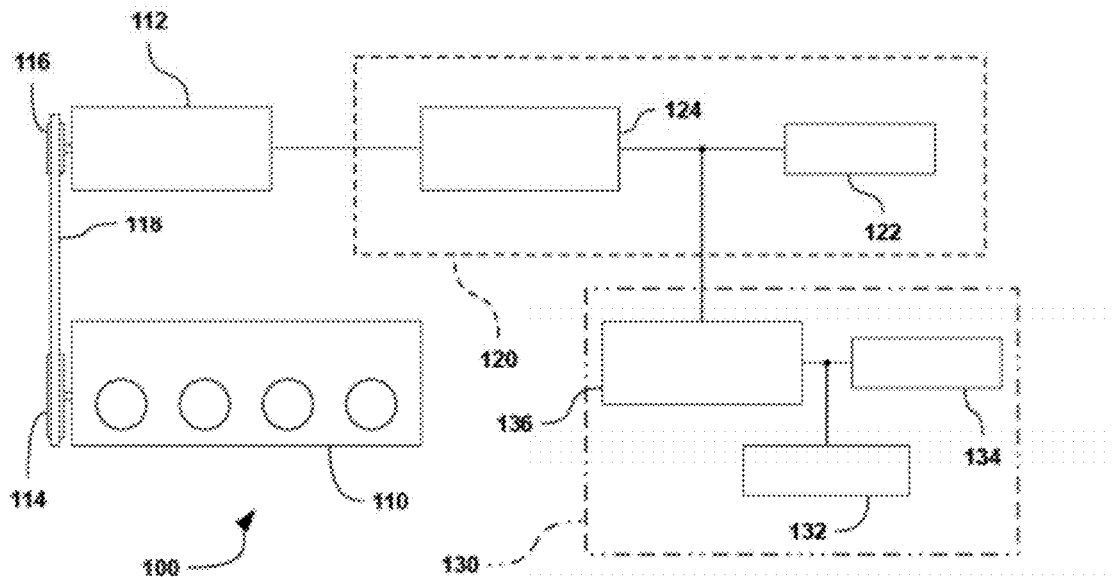
FIG. 1 is a schematic component diagram of a hybrid vehicle.

Referring to the drawings, wherein like reference numbers correspond to like or similar components throughout the several figures, there is shown in FIG. 1 a schematic component diagram of a hybrid vehicle 100. An engine 110 is drivingly connected to an electric machine, such as a motor/generator 112, via first and second pulleys 114, 116, which are connected by a belt 118.

The engine 110 may be an internal combustion engine, such as a spark-ignited gasoline engine or a compression-ignited diesel engine. The engine 110 is readily adaptable to provide its available power to a transmission (not shown) at a range of operating speeds. The hybrid vehicle 100 is intended solely as an illustrative application into which the present invention may be incorporated. The claimed invention is not limited to the particular arrangement shown in the drawings. Furthermore, the hybrid vehicle 100 illustrated herein has been greatly simplified, as will be recognized by those having ordinary skill in the art.

The motor/generator 112 may also be referred to as an electric machine and represents a device capable of generating electricity from power supplied by the engine 110 or power captured from the kinetic energy of the hybrid vehicle 100 through regenerative braking. The motor/generator 112 captures kinetic energy by generating electric energy, which may then be stored in an energy storage device for subsequent use.

Those having ordinary skill in the art will recognize that mechanisms other than the pulleys 114, 116 and belt 118 may be utilized to transfer power between the engine 110 and the motor/generator 112. For example, and without limitation, the engine 110 and motor/generator 112 may be drivingly connected via gears, chains and sprockets, or directly connected by a shaft or sleeve shaft.

The motor/generator 112 is electrically connected to a hybrid circuit 120. A hybrid battery 122 acts as an energy storage device for the hybrid circuit 120 and may be a chemical battery. An inverter 124 is electrically connected to the motor/generator 112 and hybrid battery 122 and allows conversion between direct current (DC) and alternating current (AC). A control unit (not shown) or controller is employed for regulating the electrical power interchange between the hybrid battery 122 and the motor/generator 112. The control unit may include multiple control modules or components and may be monitoring, controlling, and communicating with some, or all, of the components of the hybrid vehicle 100. The control unit may regulate electrical power interchange by acting on the inverter 124. Furthermore, the control unit may be configured to execute tasks other the regulating power flow.

When acting as a generator, the motor/generator 112 provides electricity that may be stored in the hybrid battery 122. When acting as a motor, the motor/generator 112 may remove energy stored within the hybrid battery 122.

The hybrid vehicle 100 includes a low-voltage circuit 130, which may be referred to herein or in the figures as LVC 130, is electrically connected to the hybrid circuit 120. The low-voltage circuit 130 provides power to the low-voltage vehicle loads 132. These loads, also referred to as accessory loads, may power devices within the hybrid vehicle 100. For example and without limitation, audio visual systems, dash board electronics, starter motors, fans, air-conditioning systems, and interior lights may be low-voltage vehicle loads 132 which draw power from the low-voltage circuit 130.

The low-voltage circuit 130 includes a low-voltage battery 134, which may be referred to herein or in the figures as LV battery 134, is electrically connected to, and may be used to provide the power to operate, the low-voltage vehicle loads 132. The low-voltage battery 134 may be referred to as a twelve-volt (12V) battery, because the low-voltage circuit 130 and low-voltage vehicle loads 132 may be configured to operate on approximately twelve volts of potential. Alternatively, the low-voltage battery 134 may also be referred to as a starting, lighting, and ignition (SLI) battery.

The hybrid circuit 120 operates at higher potential than the low-voltage circuit 130. An accessory power module 136 is electrically connected to the hybrid circuit 120 and provides power to the low-voltage circuit 130 at suitable levels. Depending upon the operating conditions of the hybrid vehicle 100, the accessory power module 136 may directly power the low-voltage vehicle loads 132, charge the low-voltage battery 134, or a combination of both. The control unit may be configured to blend operation of the inverter 124 and accessory power module 136, allowing for increased efficiency by accounting for operation of both components simultaneously.

Figure 2:
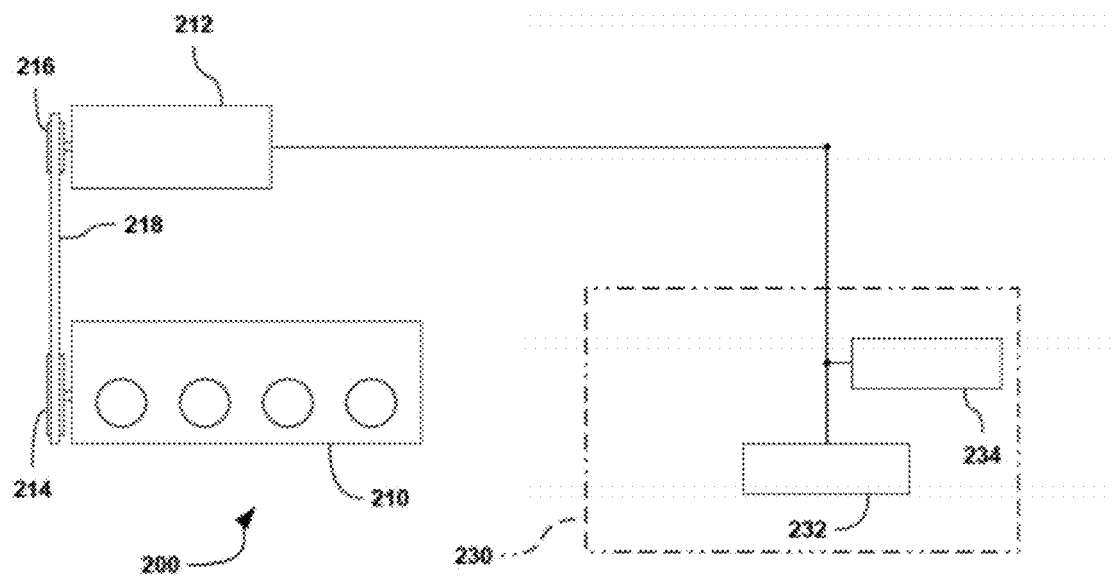
FIG. 2 is a schematic component diagram of a conventional vehicle.

Referring now to FIG. 2, and with continued reference to FIG. 1, there is shown a schematic component diagram of a conventional vehicle 200. An engine 210 is drivingly connected to a generator, such as an alternator 212, via first and second pulleys 214, 216, which are connected by a belt 218.

The conventional vehicle 200 includes a low-voltage circuit 230 (LVC 230), but does not include a hybrid circuit or an accessory power module. The low-voltage circuit powers low-voltage vehicle loads 232 and includes a low-voltage battery 234, similar to those shown in FIG. 1. The conventional vehicle 200 further includes a control unit (not shown) or controller employed for regulating the electrical power flow in the conventional vehicle. The control unit may act directly on the alternator 212.

As used herein for either the hybrid battery 122 or the low-voltage battery 134, 234, charging refers, generally, to increasing the state of charge (SOC) of the battery. State of charge is the equivalent of a fuel gauge for the battery; representing stored electrical energy that may be consumed by the hybrid vehicle 100 or conventional vehicle 200. The units of state of charge may be expressed as percentage points (0%=empty; 100%=full). Charging refers, generally, to increasing the state of charge of the battery; and, conversely, discharging generally refers to decreasing the state of charge of the battery.

Figure 3A:
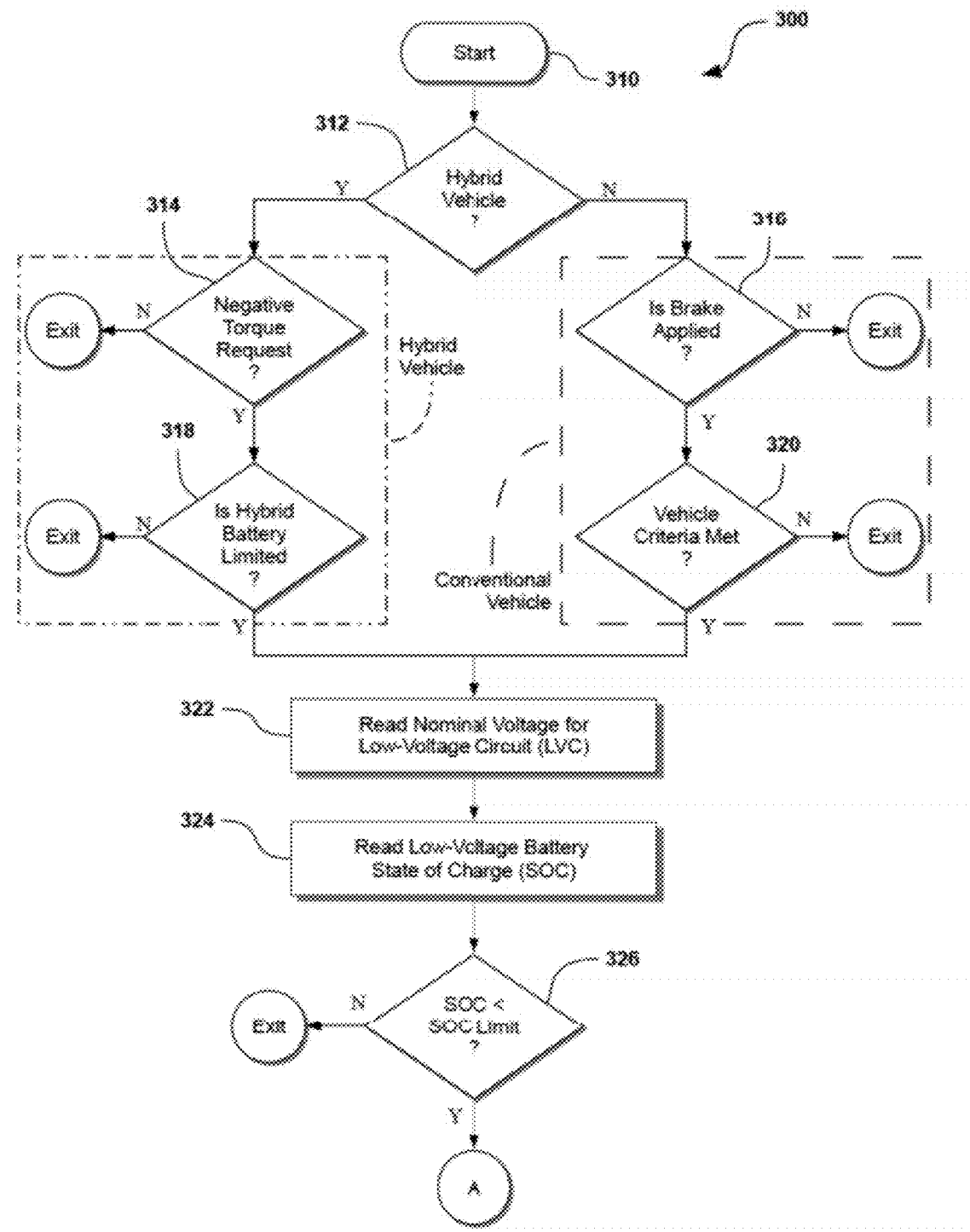
FIG. 3A is a portion of a schematic flowchart of an algorithm for controlling low-voltage circuits in vehicles.
Figure 3B:
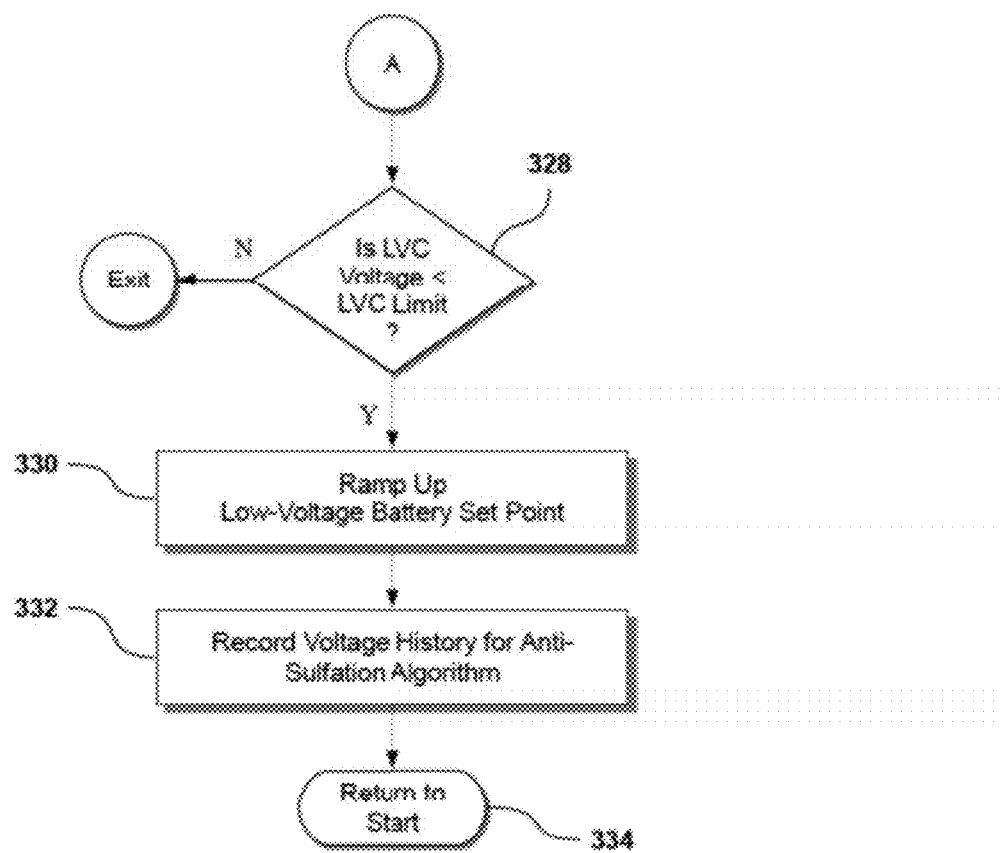
FIG. 3B is a further portion of the schematic flowchart shown in FIG. 3A.
Figure 3B:
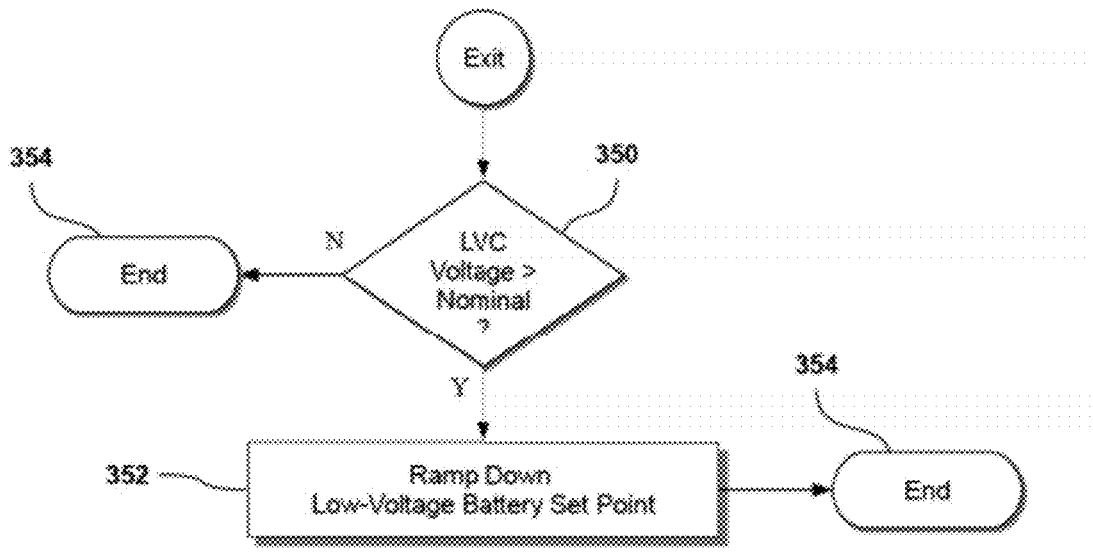

Referring now to FIG. 3A and FIG. 3B, and with continued reference to FIGS. 1 and 2, there is shown an algorithm 300 for controlling the low-voltage circuit 130 of the hybrid vehicle 100 or the conventional vehicle 200. The algorithm 300 may be executed by a control system (not shown) as part of, for example, the hybrid control module (for the hybrid vehicle 100) or the engine control unit (for the conventional vehicle 200), or the controller for algorithm 300 may be incorporated into a separate control system or structure.

In FIG. 3A, the algorithm 300 begins at an initiation or start step 310, during which time the algorithm 300 is monitoring operating conditions of the vehicle 100, 200. The algorithm 300 may continuously or intermittently monitor numerous conditions of the vehicle 100, 200.

The algorithm 300 next determines whether surplus load from motor/generator 112 or alternator 212 is available. Surplus load refers, generally, to conditions of the hybrid vehicle 100 or conventional vehicle 200 that allow or result in additional electrical generating capacity to meet the driver's request. Surplus load may occur when the hybrid vehicle 100 or the conventional vehicle 200 is decelerating, such that the kinetic energy of the hybrid vehicle 100 or the conventional vehicle 200 may be transferred to electrical energy.

If surplus load is available, the algorithm 300 may be able to capture some, or all, of that surplus load and store it as energy in the low-voltage battery 134, 234. Storing surplus load as electrical energy in the low-voltage battery 134, 234 may result in a decrease in overall fuel usage (an increase in fuel economy) and may reduce the amount of kinetic energy dissipated by friction brakes. Furthermore, the low-voltage battery 134, 234 is charged without burning additional fuel in the engine 110, 210 for the specific purpose of charging the low-voltage battery 134, 234.

Step 312 determines whether the algorithm 300 is being implemented on a hybrid (100) or conventional vehicle (200). Depending upon the vehicle type, the algorithm 300 determines whether there is a negative torque request or whether the brake is applied by the operator of the vehicle 100, 200, in steps 314 and 316, respectively. The "negative torque request" refers to the controller interpretation that the driver would like to decelerate the vehicle, requesting a negative crankshaft torque. A negative torque request or application of the brakes indicates that the driver is requesting a deceleration, during which the vehicle 100, 200 is losing kinetic energy.

Deceleration may be accomplished by converting this kinetic energy into heat energy via friction brakes. Alternatively, a similar deceleration rate may be accomplished by converting this kinetic energy into a combination of (reduced) heat energy via the friction brakes and electrical regenerative braking energy. However, to accomplish electrical regenerative braking, either the hybrid battery 122 or the low-voltage battery 134, 234 must be able to accept an increasing charge (and store the electrical energy created).

If there is neither a negative torque request in the hybrid vehicle 100 nor application of the brake in the conventional vehicle 200, the algorithm 300 will proceed to an exit path, which is described in more detail herein. If there is a deceleration request, the algorithm 300 will be used to determine whether the motor/generator 112 or alternator 212 may be utilized to slow the vehicle 100, 200 through the creation of energy with regenerative braking, and whether that energy may be stored in either the hybrid battery 122 or the low-voltage battery 134, 234.

In step 318, the algorithm 300 will determine whether the hybrid battery 122 is capable of storing the real-time charge load available from the motor/generator 112. If the hybrid battery 122 is charge-limited and cannot store or accept the available power from the motor/generator 112, there is surplus load available, which the algorithm 300 will seek to capture and store in the low-voltage battery 134. If the hybrid battery 122 is capable of capturing and storing the charge, the algorithm 300 will proceed to the exit path.

The hybrid battery 122 may be charge-limited, and therefore not be able to accept the available electrical energy charge under the conditions of high state of charge (SOC), cold battery temperatures, hot battery temperatures, or old age. In order for the hybrid battery 122 to increase its state of charge, the hybrid battery 122 may need to be within a temperature range (e.g. above a minimum temperature and below a maximum temperature). If the hybrid battery 122 is charge-limited, and the excess generator load is not captured by the algorithm 300, the negative torque request may be met through application of the brakes or engine braking.

In step 320, the algorithm 300 will determine whether the conventional vehicle 200 meets criteria for regenerative braking, via increased alternator load, which may be captured by the low-voltage battery 234. Conditions of the conventional vehicle 200 monitored and evaluated in step 320 may include, without limitation: vehicle speed, the duration and magnitude of application of the brake pedal, any deviation from creep/coast deceleration rate, engine torque command, and fuel on/off state. If the vehicle criteria cannot be met, the algorithm 300 will proceed to the exit path, and there will not be additional generator load as the vehicle is in deceleration.

The vehicle conditions may not be able to be satisfied, for example, because the driver's brake request is too small and the conventional vehicle 200 will sufficiently slow due to natural vehicle dynamics and efficiencies. Therefore, the alternator 212 is not needed to slow the conventional vehicle 200, and there is no surplus generator load available for capture by the algorithm 300.

At step 322, the algorithm 300 reads the nominal voltage for the low-voltage circuit 130, 230. The nominal voltage for the low-voltage circuit 130, 230 is the desired voltage set point to meet the needs of the low-voltage circuit 130, 230; e.g. to power the low-voltage vehicle loads 132, 232 and, if necessary, to charge the low-voltage battery 134, 234.

At step 324, the algorithm 300 reads or calculates the state of charge of the low-voltage battery 134, 234. The state of charge may be provided by the control unit or separate controls, or may be calculated by the controller from several factors (such as current, voltage, temperature, et cetera). Reading the state of charge will determine whether the low-voltage battery 134, 234 is capable of receiving and storing energy captured surplus load from motor/generator 112 or alternator 212.

At step 326, the algorithm 300 determines whether the state of charge of the low-voltage battery 134, 234 is below the maximum state of charge. If the state of charge is already at its maximum, the low-voltage battery 134, 234 is not capable of accepting additional electrical energy and there is essentially nowhere to store the surplus load from motor/generator 112 or alternator 212, and the algorithm 300 moves to the exit path. However, if the state of charge is below its maximum, the low-voltage battery 134, 234 may be available to store energy from regenerative braking, and the algorithm 300 moves through a continuation path A to step 328 (shown on FIG. 3B).

At step 328, the algorithm 300 determines whether the voltage of the of the low-voltage circuit 130, 230 is below the maximum voltage. If the voltage is already at its maximum, increasing the commanded voltage to the low-voltage circuit 130, 230 may cause damage to the components making up the low-voltage vehicle loads 132, 232, or to the low-voltage battery 134, 234, and the algorithm 300 moves to the exit path. If the voltage of the low-voltage circuit 130, 230 can be increased, the algorithm 300 may begin capturing and storing the surplus load from motor/generator 112 or alternator 212.

At step 330, the algorithm 300 begins to override the steady-state settings of the low-voltage circuit 130, 230 by ramping up the set point for the low-voltage battery 134, 234. For the hybrid vehicle 100, this is accomplished by increasing the commanded voltage set point to the accessory power module 136. For the conventional vehicle 200, this is accomplished by increasing the command voltage set point to the alternator 212. Increasing the set point allows the low-voltage battery 134, 234 to increase its state of charge by taking in current and storing energy. This increase in state of charge of the low-voltage battery 134, 234 is derived from the surplus energy captured with regenerative braking by the motor/generator 112 or alternator 212.

The surplus load captured in the low-voltage battery 134, 234 would otherwise be lost without the actions described herein. Without the algorithm 300 capturing the surplus load, an increase in the state of charge of the low-voltage battery 134, 234 would require increasing power flow from the engine 110, 210 or draining power from the hybrid battery 122. The algorithm 300 increases the state of charge of the low-voltage battery 134, 234 without burning additional fuel, and therefore may yield a fuel economy improvement.

At step 332, the algorithm 300 records the increased set point of the low-voltage battery 134, 234 in an anti-sulfation algorithm. Sulfation is due to formation of large, non-conductive lead sulfate crystals on the battery plates. Lead sulfate formation is part of each charge/discharge cycle, but in the discharged condition the crystals become large and block passage of current through the electrolyte.

Sulfation may occur when low-voltage battery 134, 234 is not fully charged for an extended period of time—i.e. when the state of charge is held at less than 100%. However, power usage in the vehicle 100, 200 may be reduced by maintaining the state of charge at a relatively low value—as this reduces the voltage at the low-voltage loads 132, 232 and reduces power consumption. Therefore, there may be conflicting requirements: maintain low state of charge for reduced power consumption but maintain high state of charge to reduce or counteract sulfation. Sulfation may be overcome by periodically increasing the voltage set point of the low-voltage battery 134, 234. The energy for this charging, or anti-sulfation process, may be supplied via an increase in power from the engine 110, 210 or by draining energy stored in the hybrid battery 122. However, the algorithm 300 yields an increase in the set point of the low-voltage battery 134, 234, which may also contribute to the anti-sulfation process. Therefore, by recording the captured energy in the low-voltage battery 134, 234, the anti-sulfation algorithm may be able to forego a future anti-sulfation charging of the low-voltage battery 134, 234 during fueled operation, when the energy supplied is not from surplus load.

After recording the voltage history in the anti-sulfation algorithm, the algorithm 300 proceeds to step 334, and returns to the start step 310. By returning to the start step 310, the algorithm reassesses the vehicle conditions and whether or not further surplus generator load is available and whether the algorithm 300 will continue capturing that energy in the low-voltage battery 134, 234.

The energy captured in the low-voltage battery 134, 234 by the algorithm 300 may subsequently be used to power the low-voltage vehicle loads 132, 232 without drawing additional energy from either the engine 110, 210 or the hybrid battery 122. Usage of this captured energy may yield fuel economy gains by foregoing the need to power the low-voltage vehicle loads 132, 232 with energy from the engine 110, 210.

The algorithm 300 utilizes the exit path to return the low-voltage circuit 130, 230 to steady-state operating conditions, if necessary, before ending the method. Note that the exit path may be reached via any of the points shown in FIGS. 3A and 3B, including returning to the start 310. Also the algorithm 300 may include a cutoff or abort trigger which cuts off implementation of the algorithm 300 at any point in order to return to steady-state conditions through the exit path.

At step 350, the algorithm 300 determines whether the voltage of the of the low-voltage circuit 130, 230 is currently above the nominal voltage, which would indicate that the system is currently in an override mode and the low-voltage battery 134, 234 is being charged by surplus loads from motor/generator 112 or alternator 212. If the low-voltage circuit 130, 230 is operating at increased voltage, the set point of the low-voltage battery 134, 234 will need to be returned to steady-state levels, and the algorithm 300 will proceed to step 352.

At step 352, the algorithm 300 begins to ramp down the override settings of the low-voltage battery 134, 234 and low-voltage circuit 130, 230. Returning the set point to steady state allows the low-voltage battery 134, 234 to slowly discharge its captured energy by supplying current to operate the low-voltage vehicle loads 132, 232. While the low-voltage battery 134, 234 is discharging, reduced (or no) energy from the engine 110, 210 or the hybrid battery 122 is used to power the low-voltage vehicle loads 132, 232. After returning the low-voltage circuit 130, 230 to nominal voltage, the algorithm 300 proceeds to an end step 354.

If the low-voltage circuit 130, 230 is not operating at increased voltage, no action is needed and the algorithm 300 moves direction from step 350 to end step 354. Alternatively, instead of end step 354, the algorithm 300 could return to start step 310, for continuous or looping operation. The algorithm 300 may occur very rapidly, and act as a constant monitoring method, or may loop regularly to capture all available surplus load from the motor/generator 112 or alternator 212.

Figure 4:
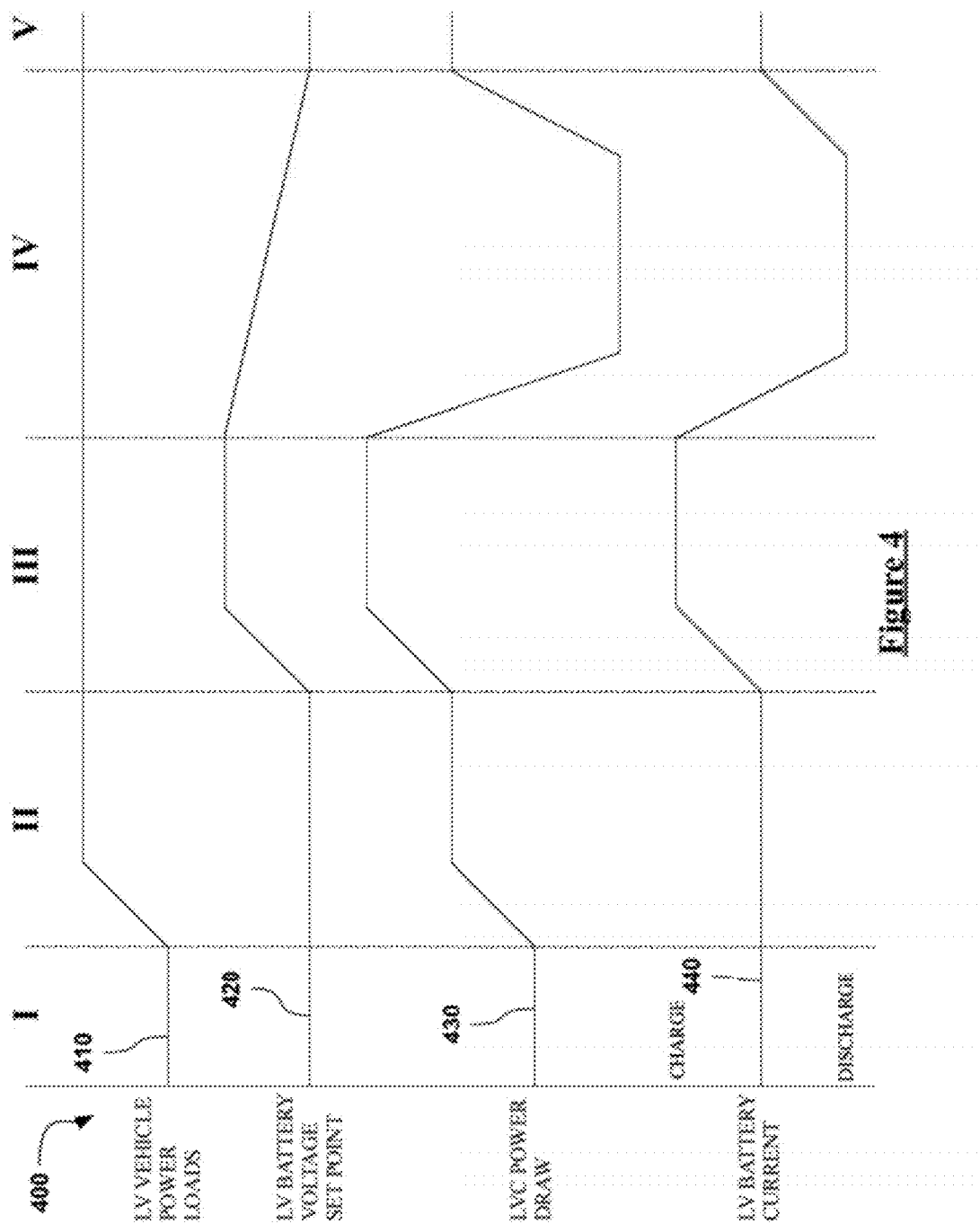
FIG. 4 is a schematic chart illustrating properties of the components during operation of the vehicle.

Referring now to FIG. 4, and with continued reference to FIGS. 1-3B, there is shown a schematic chart 400 illustrating properties of select components plotted with respect to time during operation of the vehicle 100, 200 and implementation of the algorithm 300. The properties shown are only exemplary; and the exact values, and magnitudes, of the properties will vary with the exact vehicle 100, 200. The time periods I-V shown are also illustrative only and are not meant to be limiting or to represent length of time directly proportional to the size of the time period shown.

Line 410 represents the low-voltage vehicle loads 132, 232. Line 420 represents the set point of the low-voltage battery 134, 234. Line 430 represents the power drawn by the low-voltage circuit 130, 230. In the hybrid vehicle 100, line 430 may also be representative of the set point of the accessory power module 136. Line 440 represents direction of current flow to the low-voltage battery 134, 234.

Time period I represents an initial or steady-state operation. During time period I, the low-voltage vehicle loads 132, 232 are shown as relatively low on line 410. The low-voltage battery 134, 234 is set to a first voltage set point. In many applications of the algorithm 300, the first voltage set point (which may also be referred to as steady-state set point) for the low-voltage battery 134, 234 may be approximately 12.5-13.8 volts, or other set points recognizable by those having ordinary skill in the art. Because the low-voltage vehicle loads 132, 232 are relatively low, the power drawn by the low-voltage circuit 130, 230 is also relatively low, as shown on line 430. The low-voltage battery 134, 234 is neither charging (upward, as viewed in FIG. 4) nor discharging (downward, as viewed in FIG. 4), as shown on line 440.

Time period II represents an increase in the low-voltage vehicle loads 132, 232, as shown by the relative increase in line 410. This increase may occur due to additional fans running in the passenger compartment or turning on additional audio-visual equipment. The low-voltage battery 134, 234 remains set to its steady-state level.

To match the increase in the low-voltage vehicle loads 132, 232 during time period II, the power drawn by the low-voltage circuit 130, 230 also increases, as shown on line 430. However, the battery current, shown on line 440, does not change. This is because the set point voltage has not changed. Charging and discharging of the low-voltage battery 134, 234 is only accomplished by changing the voltage at the battery terminals. The increased power demand is met by the accessory power module 136 for the hybrid vehicle 100 and the alternator 212 for the conventional vehicle 200. Hybrid vehicle 100 may source this power from the hybrid battery 122, the motor generator 112 or a combination thereof. For the conventional vehicle 200, the additional load will be supplied by the alternator 212. While time period II is shown for illustrative purposes, many occurrences of algorithm 300 in usage will progress immediately from time period I to time period III, as accessory loads need not increase for the algorithm 300 to determine whether excess generator load may be captured.

Time period III represents recognition by the algorithm 300 that surplus load is available from the motor/generator 112 or alternator 212. If the algorithm 300 determines that conditions are satisfactory for capturing that surplus load with the low-voltage battery 134, 234, the set point for low-voltage battery 134, 234 is increased, as shown on line 420. Increasing the voltage set point will proportionally increase the power used by the vehicle loads even though no additional loads were turned on. However, because there are no additional loads being requested, this proportion increase is not shown on line 410.

With the increased set point for the low-voltage battery 134, 234 the power drawn by the low-voltage circuit 130, 230 also increases, as shown on line 430. This additional power is split between the low-voltage vehicle loads 132, 232 and the low-voltage battery 134, 234. The low-voltage battery 134, 234 is increased from the first voltage set point (as shown in periods I and II) to a second voltage set point, which is higher and allows the low-voltage battery 134, 234 to charge. As shown on line 440, the low-voltage battery 134, 234 begins to draw current and store energy by increasing its state of charge.

Time period IV represents recognition by the algorithm 300 either that surplus load is no longer available or that the low-voltage battery 134, 234 can no longer accept the additional energy, and thus algorithm 300 enters the exit path back toward the conditions prior to algorithm 300 being enabled, such as those shown in time period I or time period II. In time period IV, the voltage set point for low-voltage battery 134, 234 is gradually decreased, as shown on line 420. As shown on line 430, the total power drawn by the low-voltage circuit 130, 230 decreases to below the initial state even though the vehicle loads on line 410 remain constant. This is because the state of charge of the low-voltage battery 134, 234 was increased. Now that the set point voltage is being reduced, the low-voltage battery 134, 234 begins to discharge into the low-voltage circuit 130, 230. This reduces the effective load on the accessory power module 136 for the hybrid vehicle 100 or the on alternator 212 for the conventional vehicle 200.

During time period IV, the low-voltage vehicle loads 132, 232 are being powered, either in whole or in part, by energy stored in the low-voltage battery 134, 234. Therefore, the low-voltage circuit 130, 230 has reduced electrical output. As it powers the low-voltage vehicle loads 132, 232, the low-voltage battery 134, 234 discharges, as shown on line 440.

Time period V represents return to the previous steady-state operation, which in this example was time II. Time period V may alternatively return to the operating conditions shown in time period I, and is not dependant upon the level of power drawn to the accessories in the low-voltage circuit 130, 230.

As the vehicle 100, 200 transitions from time period IV to V, the low-voltage vehicle loads 132, 232 are shown returning to the relatively low level on line 410. The set point of the low-voltage battery 134, 234 is returned from the second voltage set point to the first voltage set point (the steady-state level). After the low-voltage battery 134, 234 discharges the energy captured from the regenerative braking, it returns to steady-state current, as shown on line 440, and is neither charging nor discharging. Because the low-voltage battery 134, 234 is no longer providing power for the low-voltage vehicle loads 132, 232, the low-voltage circuit 130, 230 draws power for that purpose from the accessory power module 136 or alternator 212. This is shown by line 430.

Time period III represents the capture of otherwise surplus energy from the motor/generator 112 or alternator 212. Time period IV represents the use of that energy to power the low-voltage vehicle loads 132, 232 without using additional fuel from the engine 110, 210.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. The best modes and other embodiments for carrying out the claimed invention have been described in detail. However, those familiar with the art to which this invention relates will recognize various alternative designs and embodiments for practicing the invention within the scope of the appended claims.

The invention claimed is:

1. A method for controlling a low-voltage circuit of a hybrid vehicle having a generator and a hybrid circuit in communication with the low-voltage circuit, wherein the hybrid circuit includes a hybrid battery and the low-voltage circuit includes a low-voltage battery, the method comprising:
    monitoring operating conditions of the vehicle;
    determining whether surplus generator load is available, wherein determining whether surplus generator load is available includes:
        determining whether the hybrid battery is capable of accepting power generated through regenerative braking, and
        determining whether the low-voltage battery is capable of accepting power generated through regenerative braking;
    capturing the available surplus generator load;
    charging the low-voltage battery with the surplus generator load;
    utilizing the surplus generator load for anti-sulfation of the low-voltage battery; and
    powering the low-voltage circuit with the surplus generator load.

2. The method of claim 1, wherein determining whether the hybrid battery is capable of accepting power generated through regenerative braking includes determining one of the temperature of the hybrid battery and the state of charge of the hybrid battery.

3. The method of claim 2, wherein determining whether the hybrid battery is capable of accepting power generated through regenerative braking includes determining whether the temperature of the hybrid battery is above a minimum temperature and below a maximum temperature.

4. The method of claim 3, further comprising powering the low-voltage circuit with energy stored in the low-voltage battery as a result of charging the low-voltage battery with the surplus generator load.

5. The method of claim 4, wherein monitoring operating conditions of the vehicle includes monitoring for one of a negative torque request and a braking event.

6. The method of claim 1, further comprising powering the low-voltage circuit with energy stored in the low-voltage battery as a result of charging the low-voltage battery with the surplus generator load.

7. A method for controlling a low-voltage circuit of a vehicle having a generator, wherein the vehicle is a hybrid vehicle and further includes a hybrid circuit in communication with the low-voltage circuit and having a hybrid battery, and wherein the low-voltage circuit includes a low-voltage battery, the method comprising:
    monitoring operating conditions of the vehicle for one of a negative torque request and a braking event;
    determining whether surplus generator load is available, wherein determining whether surplus generator load is available includes determining whether the hybrid battery is capable of accepting power generated through regenerative braking, and determining whether the low-voltage battery is capable of accepting power generated through regenerative braking;
    capturing the available surplus generator load;
    powering the low-voltage circuit with the surplus generator load;
    charging the low-voltage battery with the surplus generator load; and
    powering the low-voltage circuit with energy stored in the low-voltage battery as a result of charging the low-voltage battery with the surplus generator load.

8. The method of claim 7, wherein determining whether the hybrid battery is capable of accepting power generated through regenerative braking includes determining one of the temperature of the hybrid battery and the state of charge of the hybrid battery.

9. The method of claim 8, wherein determining whether the hybrid battery is capable of accepting power generated through regenerative braking includes determining whether the temperature of the hybrid battery is above a minimum temperature and below a maximum temperature.

10. The method of claim 9, further comprising utilizing the surplus generator load for anti-sulfation of the low-voltage battery.

11. The method of claim 10,
    wherein the low-voltage battery has a first voltage set point prior to charging the low-voltage battery with the surplus generator load; and
    wherein charging the low-voltage battery with the surplus generator load includes increasing the low-voltage battery to a second voltage set point.

12. The method of claim 11, further including:
    ending charging of the low-voltage battery with the surplus generator load; and
    decreasing the low-voltage battery from the second voltage set point to the first voltage set point.

13. The method of claim 12, wherein decreasing the low-voltage battery from the second voltage set point to the first voltage set point further includes a gradual transition from the second voltage set point to the first voltage set point.

* * * * *